United States Patent [19]

Smith

[11] Patent Number: 4,466,755
[45] Date of Patent: Aug. 21, 1984

[54] HEMISPHERICAL BALL AND SOCKET JOINT

[75] Inventor: Joseph E. Smith, Birmingham, Mich.

[73] Assignee: O & S Manufacturing Company

[21] Appl. No.: 292,634

[22] Filed: Aug. 13, 1981

Related U.S. Application Data

[63] Continuation-in-part of Ser. No. 061,644, Jul. 30, 1979, Pat. No. 4,347,014, and Ser. No. 263,778, May 14, 1980.

[51] Int. Cl.³ ............................................. F16C 11/06
[52] U.S. Cl. ..................................... 403/36; 403/138; 403/144
[58] Field of Search ............... 403/138, 144, 137, 124, 403/125, 122, 136, 133, 129, 36, 39

[56] References Cited

FOREIGN PATENT DOCUMENTS

| 2162597 | 11/1972 | Fed. Rep. of Germany | 403/122 |
| 1136033 | 12/1956 | France | 403/138 |
| 796706 | 6/1958 | United Kingdom | 403/138 |
| 1125420 | 8/1968 | United Kingdom | 403/138 |

Primary Examiner—Andrew V. Kundrat
Attorney, Agent, or Firm—Hauke and Patalidis

[57] ABSTRACT

A knuckle or swivel joint of the half-ball and socket type comprising a stud terminating in an enlarged diameter half-ball member disposed in the socket member and having an end flat surface engaged by a resilient retainer cap disposed in the socket member. The retainer cap is elastically pre-loaded in an appropriate direction which causes firm engagement of the spherical bearing surfaces of the socket and ball in mutual swivelling engagement, thus, among others, compensating for wear.

6 Claims, 5 Drawing Figures

HEMISPHERICAL BALL AND SOCKET JOINT

CROSS REFERENCE TO RELATED APPLICATIONS

This application is a continuation-in-part of application Ser. No. 061,644 filed July 30, 1979 and now U.S. Pat. No. 4,347,014, and Ser. No. 263,778 filed May 14, 1980, all assigned to the same assignee as the present application.

BACKGROUND OF THE PRESENT INVENTION

The present invention relates to a bearing assembly for knuckle or swivel joints in general, and more particularly to half-ball and socket joints of very simple structure.

Knuckle or swivel joints of the half-ball and socket type are commonly used in motor vehicle steering tie rod assemblies, in drag links, torque rods and like structures, in which there is a requirement for transmitting a force from a member to another while permitting one member to swivel or pivot relative to the other.

Knuckle or swivel joints of the half-ball and socket type consist generally of a stud terminating in a partial ball disposed within a socket member in swivelling slidable engagement with a conforming concave spherical segment of the socket member. The engaged bearing surfaces of the half-ball and socket are often biased towards each other such as to provide a relatively tight assembly eliminating play and rattle and automatically compensating for wear of the bearing surfaces.

The shortcomings of conventional half-ball and socket joints are many. The load carrying capability of the joints is limited to the relatively small area of the peripheral surface of the half-ball engaged with the corresponding surface of the socket. A complex structure is required for providing pre-load of the bearing surfaces in arrangements where it is desired to prevent rattles and play, and to ensure automatic break-in and usage wear compensation. The amount of angulation between the elements interconnected by the joint and the load carrying characteristics of the assembly are limited.

SUMMARY OF THE INVENTION

The present invention remedies some of the inconveniences and shortcomings of the prior art by providing a knuckle or swivel joint structure of the half-ball and socket type which is lighter in weight and therefore uses less material and which has fewer parts than generally required for knuckle or swivel joints for heavy-duty applications. In addition, the present invention provides a knuckle or swivel joint which is able to handle large amounts of angular displacement between the joined elements, which has a tight fit between the bearing surfaces in mutual engagement, which is devoid of play and is rattle-proof, and which automatically compensates for break-in and usage wear.

The present invention accomplishes its many objects by way of a knuckle or swivel joint structure comprising a stud member terminating in an integral half-ball head member whose peripheral spherical surface engages a conforming concave spherical surface of the corresponding socket member, the half-ball member having a flat end face which is engaged by a resilient retainer cap holding the half-ball peripheral surface in swivelling sliding engagement with the socket spherical bearing surface. Pre-load of the bearing surfaces in engagement is effected by the resilient retainer cap being elastically stressed during assembly of the half-ball in the socket.

Other objects and advantages of the present invention will become apparent to those skilled in the art when the following description of the best modes contemplated for practicing the invention is read in conjunction with the accompanying drawing wherein like numerals refer to like or equivalent parts and in which:

DETAILED DESCRIPTION OF THE PREFERRED EMBODIMENTS

Figure 1:
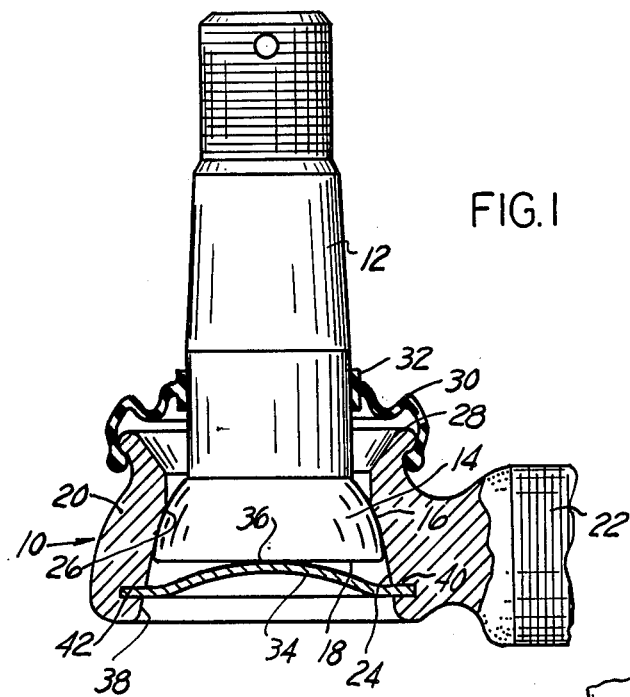
FIG. 1 is a side elevation partly in section of an example of a knuckle or swivel joint according to the present invention.
Figure 2:
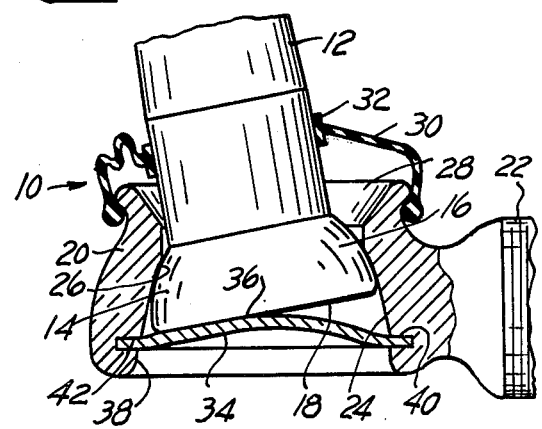
FIG. 2 is a view similar to FIG. 1 but showing the joint of FIG. 1 in an angulated position.
Figure 3:
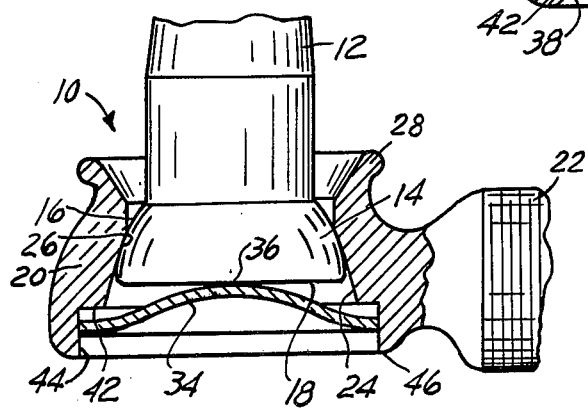
FIG. 3 is a view similar to FIG. 1 but showing the joint with its components in position prior to final assembly.

Referring to the drawings and more particularly to FIGS. 1-3, an example of structure for a knuckle or swivel joint 10 according to the present invention consists of a stud 12 provided at one end with an integral cold headed half-ball 14 having a peripheral convex surface 16 and a flat end face 18. The half-ball 14 is disposed within a socket member 20 provided with a shank 22 fastened to the periphery of the socket member 20 by any convenient means, such as by friction welding for example. The socket member 20 has a bore 24 from which projects, at one end, the stud 12 of the stud and half-ball unit. The peripheral convex spherical surface 16 of the half-ball 14 slidingly engages an inner concave spherical surface portion 26 formed in the bore 24 of the socket member 20. The half-ball 14 and its attached stud 12 are capable of swivelling relative to the socket member 20 and its attached shank 22 to an extreme angulation as illustrated at FIG. 2. The end of the bore 24 of the socket member 20 through which projects the stud 12 is in the form of a frusto-conical diverging flange 28 providing an anchoring means for one end of a flexible elastomeric bellows seal 30, whose other end is in the form of a garter ring 32 elastically encircling a portion of the peripheral surface of the stud 12. The bellows seal 30 prevents introduction of dirt or other contaminants from the ambient to the interior of the joint 10, and prevents escape of any lubricant which may be used to fill the space between the interior surface of the seal 30 and the spherical bearing surfaces 26 of the socket member 20 and 16 of the half-ball 14.

A dished retainer cap 34, made of resilient spring metal in the form of a disk, has a convex face 36 engaged with the flat end face 18 of the half-ball 14. The retainer cap 34 is held in position at the other end of the bore 24 of the socket member 20 by an inwardly radially bent lip 38, such that the peripheral edge of the retainer cap 34 is held in a groove 40 formed between the lip 38 and an annular surface 42 in the socket member bore 24 proximate its open end.

FIG. 3 illustrates the respective components of the knuckle or swivel joint 10 in position in their free state prior to forming the lip 38. The retainer cap 34 has a more pronounced dished shape with its convex surface 36 in free engagement with the flat end face 18 of the half-ball 14. The bore 24 of the socket member 20 is provided with an enlarged diameter portion 44 terminating in a straight rim 46 at the edge of the enlarged diameter bore portion 44 and defining the annular surface 42 between the bore 24 and the enlarged diameter portion 44 of the bore. As a final step during assembly of the elements of the knuckle or swivel joint 10, the straight rim 46 is bent over, by swaging for example, radially such as to form the retaining lip 38, FIGS. 1 and 2. Simultaneously, when the retaining lip 38 is formed, the edge surface of the retainer cap 34 is displaced such as to be applied against the annular surface 42, thus elastically deforming the retainer cap 34 such that it acquires the less pronounced dished shape of FIGS. 1-2. This results in applying a definite pre-load to the spherical surface 16 of the half-ball 14 and to the spherical surface 26 of the socket member 20, through elastic deformation and flattening of the dished retainer cap 34, a portion of its convex surface 36 being in firm engagement with a corresponding portion of the flat end face 18 of the half-ball 14. During angulation of the assembly formed by the half-ball 14 and the stud 12 relative to the socket member 20, FIG. 2, the dished retainer cap 34 is further elastically deformed, with a corresponding slight displacement of the contacting areas of the half-ball flat end face 18 and retainer cap convex surface 36.

In addition to providing pre-load of the bearing surfaces, the end cap 34 form a very effective seal preventing introduction of dirt from the ambient into the bore 24 of the socket member 20, and preventing escape of lubricant which may be used to pack the space between the retainer cap 34 and the ball flat end face 18.

It will be readily apparent to those skilled in the art that the structure of the invention, consisting of only three individual components, namely the integral unit of the half-ball 14 and the stud 12, the integral unit of the socket member 20 and integral shank 22 and the retainer cap 34, is low in cost, easy to manufacture with wide machining tolerances, is not subject to noise and rattle in service in view of the pre-load applied to the bearing surfaces in swivelling engagement, is hermetically sealed with the adjunct of the bellows seals 30, and is capable of automatically compensating for wear of the bearing surfaces as a result of the dished retainer cap 34 continuously urging such bearings surfaces in mutual engagement, and that the retainer cap 34 being elastically deformable does not interfere with the correct operation of the swivel or knuckle joint 10.

Figure 4:
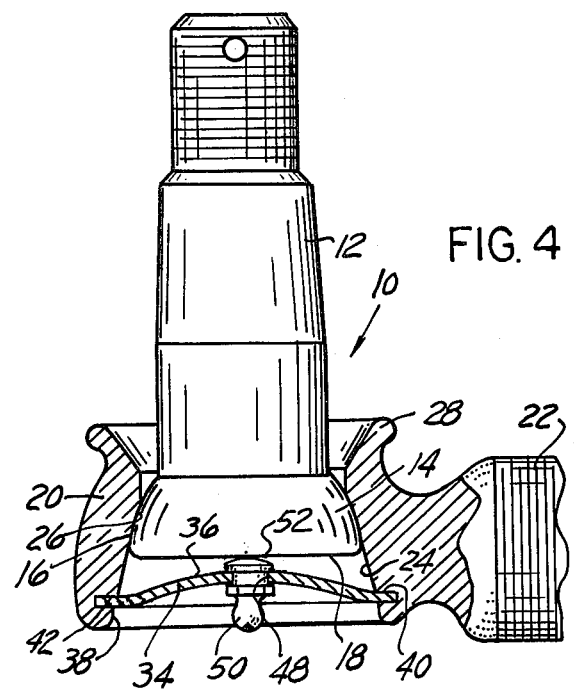
FIG. 4 is a view similar to FIG. 1 but showing a modification thereof.

In the structure illustrated at FIG. 4, the swivel or knuckle joint 10 is provided with a retainer cap 34 having a centrally disposed aperture 48 in which is press-fitted or otherwise mounted a grease fitting 50. The grease fitting has a convex end face 52 urged against the flat end face 18 of the half-ball 14 as a result of elastic deformation and partial flattening of the dished retainer cap 34 during formation, by swaging, of the cap retaining lip 38. In the structure of FIG. 4, the grease fitting 50 may eventually be used to replenish the reserve of lubricant present between the retainer cap and the flat end face 18 of the half-ball 14.

Figure 5:
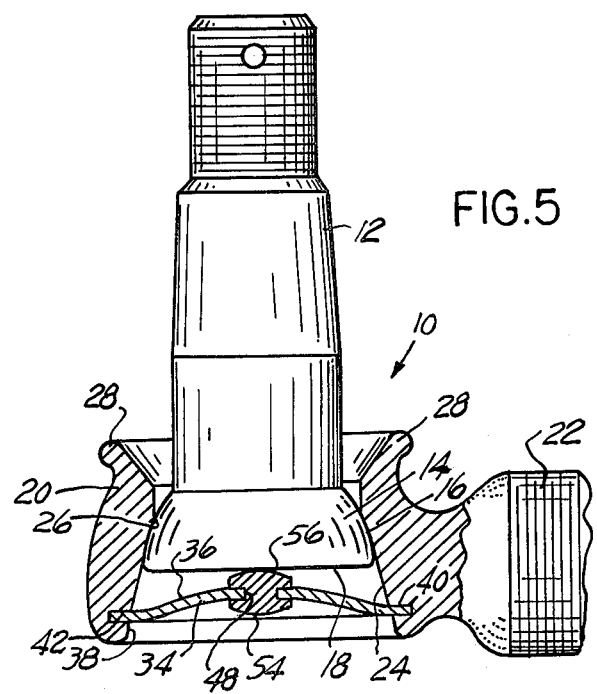
FIG. 5 is a view similar to FIG. 1 but showing a further modification thereof.

The configuration of FIG. 5 is quite similar to the configuration of FIG. 4 with the exception of the grease fitting of FIG. 4 being replaced by a bearing button 54 having a convex surface 56 in engagement with the flat end face 18 of the half-ball 14, and transmitting to the half-ball 14 and to the bearing surfaces 26 and 16 in mutual engagement a pre-load force resulting from the elastic deformation and partial flattening of the retainer cap 34 during the swaging final step of the assembly of the knuckle or swivel joint 10. The bearing button 54 may be metallic, or it may be made of plastic, or it may be made of an elastomeric material.

Having thus described the present invention by way of structural examples thereof, modification whereof will be apparent to those skilled in the art, what is claimed as new is as follows:

1. A simple and relatively light ball joint structure consisting of three separate elements in assembly, the first of said elements being an integral stud and half-ball member, said half-ball being integrally formed at one end of said stud, said half-ball having a peripheral spherical surface and a flat end face, the second of said elements being a socket member, said socket member having a bore open at both ends, a concave spherical surface disposed in the bore of said socket member proximate a first end thereof and normally engaged with the peripheral spherical surface of said half-ball such that said stud projects through said first end of said bore, and enlarged diameter portion in said bore proximate the other end of said bore, and a substantially annular flat surface between said concave spherical surface in said bore and said enlarged diameter portion of said bore, and the third of said elements being a resilient retainer cap, said retainer cap having a substantially convex surface engaged with the flat face of said half-ball, said resilient retainer cap being in the form of a disk dished towards said flat end face of said half-ball and having its edge engaged in a groove in said bore formed by swaging the edge of the socket member at said other end of the bore during assembly of said ball joint structure between said annular flat surface and said swaged-over edge such as to form a retaining lip for the edge of said dished disk while simultaneously displacing the edge of said disk towards said flat end face of said half-ball and elastically partially flattening said dished disk, whereby the spherical surfaces in engagement are pre-loaded by elastic deformation of said retainer cap.

2. A ball joint structure comprising a stud and a half-ball member integrally formed at one end of said stud, said half-ball member having a peripheral spherical surface and a flat end face, a socket member having a bore open at both ends, a concave spherical surface in the bore of said socket member proximate a first end thereof and normally engaged with the peripheral spherical surface of said half-ball member such that said stud projects through said first end of said bore, and enlarged diameter portion in said bore proximate the other end of said bore, a substantially annular surface between said concave spherical surface in said bore and said enlarged diameter portion of said bore, a resilient retainer cap having a substantially convex surface engaged with the flat face of said half-ball member, said resilient retainer cap being in the form of a disk dished towards said flat end face of said half-ball member and having its edge engaged in a groove in said bore formed by swaging the edge of the socket member at said other end of the bore during assembly of said ball joint structure between said annular flat surface and said swaged-over edge such as to form a retaining lip for the edge of said dished disk while simultaneously displacing the edge of said disk towards said flat end face of said half-ball member and elastically partially flattening said dished disk, whereby the spherical surfaces in engagement are pre-loaded by elastic deformation of said retainer cap, wherein said retainer cap has a grease fitting affixed substantially through the center of said dished disk, said grease fitting having a convex end face forming the retainer cap convex surface engaged with the flat end face of said half-ball member.

3. A ball joint structure comprising a stud and a half-ball member integrally formed at one end of said stud, said half-ball member having a peripheral spherical surface and a flat end face, a socket member having a bore open at both ends, a convex spherical surface in the bore of said socket member proximate a first end thereof and normally engaged with the peripheral spherical surface of said half-ball member such that said stud projects through said first end of said bore, an enlarged diameter portion in said bore proximate the other end of said bore, a substantially annular surface between said concave spherical surface in said bore and said enlarged diameter portion of said bore, a resilient retainer cap having a substantially convex surface engaged with the flat face of said half-ball member, said resilient retainer cap being in the form of a disk dished towards said flat end face of said half-ball member and having its edge engaged in a groove in said bore formed by swaging the edge of the socket member at said other end of the bore during assembly of said ball joint structure between said annular flat surface and said swaged-over edge such as to form a retaining lip for the edge of said dished disk while simultaneously displacing the edge of said disk towards said flat end face of said half-ball member and elastically partially flattening said dished disk, whereby the spherical surfaces in engagement are pre-loaded by elastic deformation of said retainer cap, wherein said retainer cap has a member affixed substantially at the center of said dished disk, said member having a convex surface defining the convex surface of said retainer cap engaged with the flat end face of said half-ball member.

4. The ball joint structure of claim 3 wherein said member is metallic.

5. The ball joint structure of claim 3 wherein said member is made of plastic.

6. The ball joint structure of claim 3 wherein said member is made of elastomeric material.

* * * * *